United States Patent [19]

Narita

[11] Patent Number: 4,597,217
[45] Date of Patent: Jul. 1, 1986

[54] METHOD OF KILLING FIELD MICE AND THE LIKE AND APPARATUS FOR PRACTICING THE METHOD

[75] Inventor: Haruyoshi Narita, Tokyo, Japan

[73] Assignees: Nihon Sanso Kabushiki Kaisha; Shoji Kabushiki Kaisha, both of Japan

[21] Appl. No.: 583,942

[22] Filed: Feb. 27, 1984

[51] Int. Cl.4 .................... A01M 13/00; A01M 17/00
[52] U.S. Cl. ........................................ 43/125; 43/124
[58] Field of Search .............. 43/124, 125, 129, 132.1, 43/900

[56] References Cited

U.S. PATENT DOCUMENTS

| 527,699 | 10/1894 | Manahan | 43/125 |
| 1,492,732 | 5/1924 | Knopf | 43/124 |
| 4,005,976 | 2/1977 | Rombach | 43/124 |
| 4,160,336 | 7/1979 | Query | 43/132.1 |

FOREIGN PATENT DOCUMENTS

| 293367 | 6/1928 | United Kingdom | 43/124 |
| 141701 | 2/1961 | U.S.S.R. | 43/124 |

Primary Examiner—Nicholas P. Godici
Assistant Examiner—C. McKee
Attorney, Agent, or Firm—Scully, Scott, Murphy and Presser

[57] ABSTRACT

Liquid nitrogen is poured in an amount sufficient to suffocate the field mouse to death into one of the openings of a burrow formed in the ground, and the poured liquid nitrogen is then evaporated to thereby fill the burrow with the evaporated nitrogen and cause the evaporated nitrogen to issue from the other openings by expansion thereof, whereby the field mouse in the burrow is suffocated to death. The method gives no adverse effect on living creatures except the field mice to which the method is applied and enables efficiently getting rid of mice.

3 Claims, 2 Drawing Figures

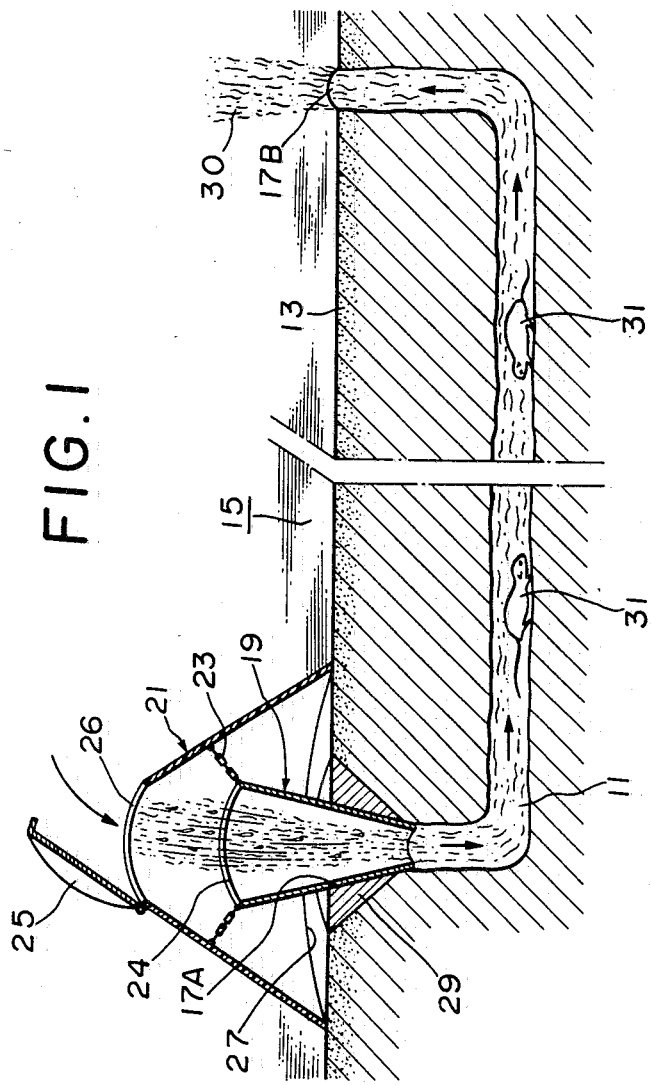

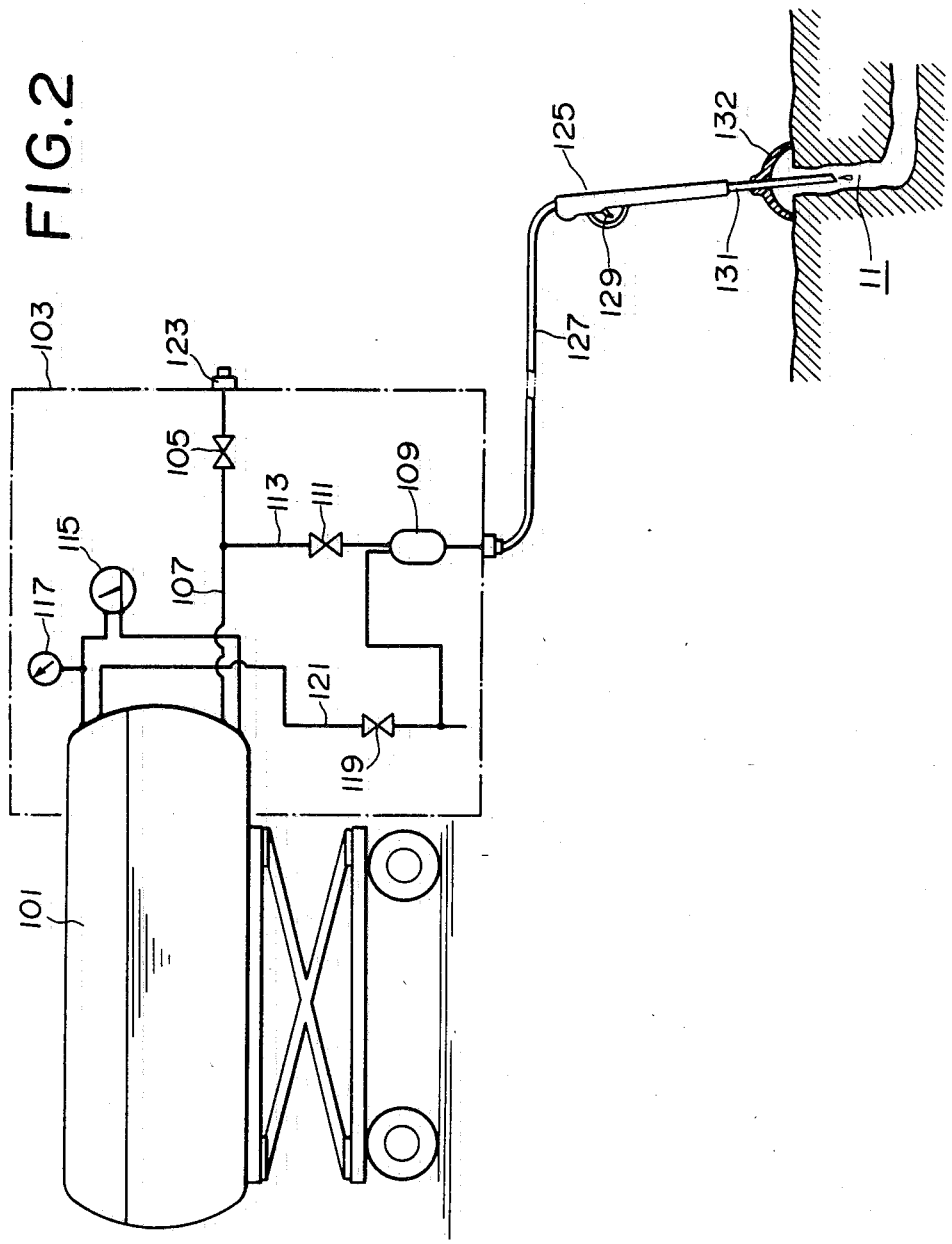

METHOD OF KILLING FIELD MICE AND THE LIKE AND APPARATUS FOR PRACTICING THE METHOD

BACKGROUND OF THE INVENTION

The present invention relates to a method of killing field mice and the like in which the field mice are suffocated to death by the use of liquid nitrogen, and further relates to an apparatus for practicing the method.

The field mouse generally makes its burrow in mountain, forest, pasture, cultivated field and the like, the burrow having meandering horizontal holes 3-5 cm in diameter and 5-20 m in length and a few openings to the surface of the ground. The field mouse eats vegetables, grain and bark and root of trees. Particularly, in orchards in snowy districts field mice which have eaten all foods stored in their burrows before snow fall move out of the burrows for food, pass clearance formed between the ground surface and snow due to the heat of the ground and eat bark and root of fruit-trees, to thereby wither them and give serious damage to the farmers. Further, field mice cause large damage such as a great deal of stock feed being eaten and dangers such as gas leakage caused by gnawing holes through gas pipes, electric leak by eating away the insulation from electric wires, etc.

In order to prevent such damage caused by field mice there have been made various proposals, but satisfactory mouse-killing effects have not yet been produced by such proposals. For example, it is a common practice to put a mouse poison in passages and holes of field mice and kill the mice which eat the poison. However, the mouse poison has strong toxicity not only to field mice but also to the other living creatures and hence careful treatment is needed for the mouse poison. Further, there is no effect of the poison unless mice eat it. Thus, the mouse poison does not provide sufficiently efficient mouse-killing effect. There is another conventional method in which a poisonous liquid is injected into a burrow of field mice to thereby poison them to death, but this method provides a poisonous matter to trees and vegetables, so that they can be withered or their crop can be improper for food. The other disadvantage of this method is that field mice sense smell of the poisonous liquid and get away.

SUMMARY OF THE INVENTION

Accordingly, it is an object of the present invention to provide a method of killing field mice which method overcomes the above-mentioned disadvantages of the prior art.

Further, it is another object of the present invention to provide an apparatus for practicing the above method.

According to one aspect of the present invention there is proposed a method of killing a field mouse wherein liquid nitrogen is introduced in an amount sufficient to suffocate the field mouse to death into one of openings of a burrow formed in the ground, and wherein the introduced liquid nitrogen is then evaporated to thereby fill the burrow with the evaporated nitrogen and cause the evaporated nitrogen to issue from the other openings by expansion thereof, whereby the field mouse in the burrow is suffocated to death. According to the present invention field mice are killed from suffocation by the use of nitrogen gas which is nontoxic from its nature and after killing the mice the nitrogen gas is diffused into the air which contains 75 wt % of nitrogen gas. Thus, the method according to the present invention gives no adverse effect on living creatures except field mice to which the method is applied and enables safety operation in killing field mice. Further, the evaporated nitrogen gas is tasteless and odorless and forcedly enters into the burrow, forcing the other gases to discharge out of openings, so that any field mice are positively killed from suffocation. Thus, the present invention efficiently gets rid of mice.

Another aspect of the present invention is to provide an apparatus for killing a field mouse comprising: a funnel member one end of which has a smaller diameter than the other end and is adapted to be fitted into an opening of a burrow, in which the field mouse lives, for pouring liquid nitrogen into the burrow; and means for sealing the other end of the funnel member from the atmosphere.

Still another aspect of the present invention is to provide an apparatus for killing a field mouse comprising: (a) means for storing liquid nitrogen; and (b) means for injecting the liquid nitrogen received from the storing means into a burrow in which the field mouse lives, the injecting means being adaped to be connected through a flexible tube to the storing means so as to receive the liquid nitrogen and including: a valve, connected to the storing means and operable by a lever member, for controlling the injection of the liquid nitrogen; a nozzle connected to the valve for receiving the liquid nitrogen and adapted to be fitted into one of openings of the burrow; and a pat member, slidably fitted around the nozzle, for closing the one opening of the burrow.

BRIEF DESCRIPTION OF THE DRAWINGS

FIG. 1 is a perspective view, in section, of one embodiment of the present invention; and FIG. 2 is a diagrammatical view, partly in section, of another embodiment of the present invention.

DETAILED DESCRIPTION OF PREFERRED EMBODIMENTS

Referring to FIG. 1, there is formed a burrow 11 of 5 voles in the surface layer 13 of the ground one meter below the surface 15, the burrow having a 3-5 cm diameter, a 5-20 m length and a few openings 17A, B . . . to the surface 15. A funnel member 19 is inserted at its smaller diameter end portion into one of the openings 17 for preventing the crumbling of the wall of that opening, so that injection of liquid nitrogen may be carried out. Outside the funnel member 19 there is disposed an enclosure member 21 of a hollow frustoconical shape having opposite open ends, the enclosure member being connected through a few connecting members 23 to the larger diameter end 24 of the funnel member 19 so that the latter may be positioned substantially concentrically with that enclosure member. In this embodiment the connecting members 23 are chains, but may be rods rigidly connecting the funnel 19 and the enclosure member. The enclosure member 21 is provided at its smaller diameter end 26 with a closure member 25 hinged to that end for closing and opening the latter. The enclosure member 21 is set around the one opening 17A, into which the funnel member 19 is fitted, with the larger diameter end 27 positioned below.

Although in the above-described embodiment, the field mouse killing apparatus includes two members, i.e., the funnel member 19 and the enclosure member 21, the enclosure member 21 may be omitted by providing a covering member such as closure member 25 to the larger diameter end 24 of the funnel member 19 for closing and opening that end. It is to be noted that the apparatus according to the present invention is not restricted in its structure to the embodiment shown in FIG. 1 if it has a structure such that an evaporated gas of liquid nitrogen, which has been poured through the larger diameter end 24 of the funnel 19 into the burrow 11, may be caused to forcedly flow through the burrow without allowing it to flow backwards through the enclosure member 21 to the atmosphere due to the pressure of the evaporated nitrogen. It is not necessary that the covering member 25 closes the end 26 of the enclosure member 21 in a strict sealing manner.

In killing field mice in the burrow 11, the covering member 25 is swung open and a predetermined amount of liquid nitrogen is then introduced through the funnel 19 into the burrow 11, after which the covering member 25 is closed. The volume of ordinal burrows is about 30 liters. For such burrows about 300 to about 500 cc of liquid nitrogen is generally used, which is evaporated into about 300 liters of nitrogen gas at normal temperature (15°-25° C.). The air in the burrow is replaced by the evaporated nitrogen gas in about 5-15 sec. The latent heat produced by evaporation of the liquid nitrogen is transferred to the soil 29 around the funnel 19 and causes the soil 29 to be frozened, so that the opening portion 17A of the burrow 11 is strengthened and the closure of the opening portion 17A due to breakage of the wall thereof is prevented. The liquid nitrogen thus introduced into the burrow 11 is evaporated by heat exchange with the soil and air, so that it is expanded to about 729 times in volume at 35° C. as large as the initial volume. Part of the evaporated nitrogen gas flows backward through the open end 24 of the funnel 19 into the enclosure member 21 where it is prevented from flowing to the atmosphere with the result that only a small amount of it flows to the atmosphere. Thus, a greater amount of the nitrogen gas is forced to flow into the burrow 11 at a constant expansion pressure, flowing towards the other openings 17 B, . . . at a speed of 1-10 m/sec. After filling the burrow 11 the nitrogen gas flows out of the other openings 17 B, . . . together with white smoke 30 produced by freezing the moisture in the air. By observing the white smoke issuing out of the openings 17B, . . . it can be seen that the burrow is filled with the nitrogen gas. The mice 31 in the burrow 11 do not run away out of the burrow since nitrogen gas is an odorless inactive gas.

The above-described apparatus is used in relatively small-scaled farms. In practicing the present invention in relatively large farms and the like a greater amount of liquid nitrogen is needed. FIG. 2 illustrates a second embodiment of the present invention which is suitable for such use. In this embodiment a heat insulation tank 101 for storing liquid nitrogen has two pairs of casters for movement and a containing capacity of 100 liters or more. The tank 101 is provided with a control panel 103 which includes a valve 105 connected through a conduit 107 as liquid nitrogen passage to that tank, a vapor/liquid separator 109 connected through a valve 111 and a conduit 113 to the conduit 107, a level gauge 115 and a pressure gauge 117. The gas phase portion of the vapor/liquid separator 109 is communicated through a valve 119 and a gas conduit 121 to the gas phase portion in the tank 101. The reference numeral 123 indicates an inlet for charging liquid nitrogen connected through the valve 105 and the conduit 107 to the tank 101. The valve 105 is normally closed and opened for filling the tank 101 with liquid nitrogen through the conduit 107. A liquid nitrogen injector 125 is connected to the vapor/liquid separator 109 through a flexible tube 127 which is preferably thermally insulated. The injector 125 has a valve (not shown) incorporated therein, the valve being actuated by a lever 129 or the like. The injector is further provided at its tip with an injection nozzle 131 about 500 mm long, which is connected through the valve incorporated in the injector to the flexible tube 127. Around the injection nozzle 131 there is slidably and tightly fitted a disc pat 132 made of rubber or the like and having 200 mm diameter.

In operation in a farm, the tank 101 and the other components are transferred to near a burrow 11 found, and then the injection nozzle 131 is inserted into the one of openings of the burrow 11. After closing the opening with the pat 132 the valve of the injector 125 is opened by actuating the lever 129 to thereby supply liquid nitrogen to the burrow 11. The liquid nitrogen issues from the tank 101 through conduit 107 and is then introduced through conduit 113 and valve 111 into the vapor/liquid separator 109 where vaporized nitrogen is separated. Thereafter, the liquid nitrogen is sent from the vapor/liquid separator 109 through the flexible tube 127 to the injector 125 from which it is injected into the burrow 11 as described aboved. The death of the mice is seen by observing white smoke issuing from the other openings of the burrow 11. This apparatus achieves the same effect as the first embodiment but may kill a greater number of mice in a much more efficient manner.

EXAMPLE 1

Liquid nitrogen was poured in an amount of 100 cc into a 25 cm×40 cm polyethylene bag. After the liquid nitrogen was evaporated, a male vole of weight about 28 g was put into it. It was noted that it was suffocated to death in 13.25 sec.

EXAMPLE 2

Two voles and one red mouse which were previously caught were allowed to enter into an old field mouse burrow which had not been used, the burrow having openings positioned within an about 3 m×3 m area. Around one of the openings there was set a mouce-killing apparatus as shown in FIG. 1, into funnel 19 of which was poured liquid nitrogen in an amount of 200 cc. Immediately after this the closure member 25 was closed. It was noted by observing white smoke issuing the other openings that the burrow was filled with the evaporated nitrogen. Further, additional liquid nitrogen was injected into the burrow in an amount of 200 cc from another opening. After 20 seconds from the pouring of liquid nitrogen the burrow was dug up and the three mice dead from suffocation were recovered.

EXAMPLE 3

Another test was carried out on the same conditions as in Example 2 placing three other voles in another burrow of substantially the same size as the burrow used in Example 2. As a result the three voles dead from suffocation were recovered.

EXAMPLE 4

The mouse-killing apparatus was set around one of the openings of a burrow formed in a pasture, and then liquid nitrogen was poured in an amount of 200 cc into the funnel 19 inserted into the one opening. It was soon observed that white smoke issued from the other openings, from which fact it was seen that the burrow extended as wide as 2.5 m ×2.5 m area. Thereafter, liquid nitrogen was introduced in an amount of 300 cc into the other two openings. After 30 seconds from this the burrow was dug up, and a vole about 30 g in weight dead from suffocation was found.

EXAMPLE 5

Liquid nitrogen was poured into another burrow in the pasture where the test in Example 4 was carried out on the same conditions as in that Example, the burrow extending as wide as about 2.5 m×2.5 m area. A vole about 25 g in weight dead from suffocation was found after the burrow was dug up.

What is claimed is:

1. A method of killing a field mouse comprising the steps of:
   (a) introducing liquid nitrogen in an amount sufficient to suffocate the field mouse to death into one of the openings of a burrow formed in the ground; and
   (b) evaporating the introduced liquid nitrogen to thereby fill the burrow with the evaporated nitrogen and cause the evaporated nitrogen to issue from the other openings by expansion of the evaporated nitrogen, whereby the field mouse in the burrow is suffocated to death.

2. A method as recited in claim 1 wherein the amount of the liquid nitrogen introduced is about 300 to about 500 cc for the burrow having a volume of 30 liters.

3. An apparatus for killing a field mouse comprising:
   (a) a funnel member having two ends with one end having a smaller diameter than the other end and which is adapted to be fitted into the opening of a field mouse burrow, said funnel being used to introduce liquid nitrogen into said burrow,
   (b) means for sealing the other end of the funnel member from the atmosphere, said sealing means comprising:
      (i) an enclosure member having two open ends for enclosing the funnel member; and
      (ii) a closure member for sealing one open end of the enclosure member, wherein the funnel member is connected to the enclosure member so that the funnel member is centrally positioned within the enclosure member with the smaller diameter end of the funnel member disposed at a position remote from the one open end of the enclosure member.

* * * * *